United States Patent [19]

Rüsch et al.

[11] 4,018,397
[45] Apr. 19, 1977

[54] UNFURLING DEVICE FOR TUBULAR EXTENDIBLE STRUCTURES

[75] Inventors: Dieter Rüsch; Heinz Gläser, both of Wedel, Holstein; Otto Lübcke, Hamburg, all of Germany

[73] Assignee: Licentia Patent-Verwaltungs-G.m.b.H., Frankfurt am Main, Germany

[22] Filed: Mar. 18, 1976

[21] Appl. No.: 668,074

[30] Foreign Application Priority Data

Mar. 25, 1975 Germany ............................ 2513080

[52] U.S. Cl. ................................ 242/54 A; 52/108
[51] Int. Cl.² .................... B65H 75/38; E04H 12/18
[58] Field of Search ............... 242/54 A, 54 R, 85; 52/108

[56] References Cited

UNITED STATES PATENTS

| | | | |
|---|---|---|---|
| 2,842,768 | 7/1958 | Halperin | 242/54 A |
| 3,385,397 | 5/1968 | Robinsky | 52/108 X |
| 3,434,674 | 3/1969 | Groskopfs | 242/54 A |
| 3,608,844 | 9/1971 | Tumulty, Jr. | 242/54 A |

FOREIGN PATENTS OR APPLICATIONS 1,276,340  8/1968  Germany .............................. 52/108

OTHER PUBLICATIONS

Rimrott, F., Entwurf und Berechnung von Lapprohen Luftfahrttechnik Raumfahrttechnik—vol. 14, No. 1, Jan. 1968, pp. 1–6.
MacNaughton et al., The Bi–Stem–A New Technique in Unfurlable Structures–2nd Aerospace Mechanisms Symposium, Preprint No. 18, May 1967.

*Primary Examiner*—George F. Mautz
*Attorney, Agent, or Firm*—Spencer & Kaye

[57] ABSTRACT

A system for simultaneously extending two storable tubular extendible members, each such member being composed of two elongate strips of elastically deformable material, each strip having been fabricated to normally assume the form of a tube having an axis parallel to the length of the strip and being capable of being coiled about an axis perpendicular to such tube axis and of being flattened in the direction of its width while retaining its ability to assume the form of a tube upon being uncoiled, there being provided two coiling drums each arranged to carry one respective component strip of each tubular member and the drums being arranged to be rotated simultaneously in order to uncoil the strips in a manner to extend the two tubular members, or to coil the strips in a manner to retract the tubular members. The system can be arranged to provide any number of pairs of tubular members by providing a plurality of axially spaced pairs of coiling drums each carrying two such strips.

6 Claims, 3 Drawing Figures

UNFURLING DEVICE FOR TUBULAR EXTENDIBLE STRUCTURES

BACKGROUND OF THE INVENTION

The present invention relates to an unfurling coiling device for a strip-shaped metal or plastic band as well as for a band made of a combination of such materials which, upon being unwound from a drum, forms itself into a self-supporting tubular structure, preferably for so-called overlapping tubes.

Overlapping tubes are known in the spacecraft industry by the acronym "STEM" (Storable Tubular Extendible Member). They serve to support extendible satellite parts. They are used, for example, as antennas, outriggers, instrument booms and as supports for solar cell panels or surfaces. In the paper by F. Rimrott, entitled "Entwurf und Berechnung von Lapprohren," (Design and Calculation for Overlapping Tubes) published in the periodical LUFTFAHRTTECHNIK RAUMFAHRTTECHNIK (Aeronautic Art, Space Travel Art) Volume 14, No. 1, January 1968, pages 1–6, and in a publication by the firm SPAR Aerospace Products Ltd., Toronto, Canada, entitled "The BI-STEM — A New Technique in Unfurlable Structures," Preprint No. 18, May 4, 1967, these devices are described in general terms.

According to these publications, tubes which are to be overlapped when the tubular member is extended are presently being made of titanium, beryllium-copper, stainless steel and aluminum. They are produced in a continuous process from a thin strip having a selected width, any desired length, and a thickness which depends on the desired strength of the tube and which is generally several thousandths of an inch. The strip is shaped in stages into a cylindrical shape with overlap and then drawn through a circular orifice where it is stress-relieved at a temperature suitable for the particular material involved and then cooled. The thus resulting overlapped tube can now be flattened out again and wound on a drum. The potential energy stored in the longitudinally flattened, coiled tube is considerable and can be utilized to extend the tube.

A BI-STEM member is an extendible tube composed of two diametrically opposed strip elements each shaped from a thin strip to assume, when free to do so, a tubular shape having an essentially circular cross section. Thus, a BI-STEM, is a dual tube. However, in the case of BI-STEM structures, the cross section of each tubular element does not form a complete closed circle, but rather has an open, C-shaped cross section and thus defines a longitudinal slot. Since the lateral sides of such a tube do not overlap, and are, in fact, spaced apart in the extended tube, a tube having this form is sometimes referred to as "underlapped".

If the so-called BI-STEM is made of two tubes, which do not individually overlap, i.e. which are underlapped, but which overlap one another, and which are boxed one inside the other with their longitudinal center lines offset by 180° and are wound either on a common drum or each on a separate drum, a distinction is made between a "single" or "twin" cassette, when speaking of the unfurling device.

An unfurling device for an overlapped tube which is driven by an electric motor is disclosed, for example, in U.S. Pat. No. 3,144,215.

SUMMARY OF THE INVENTION

It is an object of the present invention to provide an unfurling device for dual underlapped tubes which are extended in respectively opposite directions and which can easily be attached to an available component.

This is accomplished, according to the present invention, in that at least two unfurling spools, or reels, are provided which are driven in respectively opposite directions of rotation and are arranged in pairs in a plane in a spaced relationship next to one another, each reel carrying two coiled strips and one strip of each reel, when being uncoiled, forms a dual tube, the other reel with one strip from the outer strip layers on the two reels form the one tube and the inner strip layers on the two reels form the other tube. Finally, the inner strips are guided through the space between the reels to form their respective tube.

The significant advantage of the cassette according to the invention is that it makes possible the accommodation of relatively long lengths of strips in a compact arrangement and with low manufacturing costs. Moreover, perfect coiling of the two strips on each reel is assured. The particular structural arrangement results in a maximum of synchronization of the extension of the overlapped tubes in various directions with optimum utilization of the strengths of the materials employed, and with lowest possible apparatus weight. The symmetrical design permits the arrangement of a central tube or a structure supporting the cassette respectively, in the V-formed between two strips of one tube in the region between their reels and the point of tube formation.

DESCRIPTION OF THE PREFERRED EMBODIMENT

Figure 1:
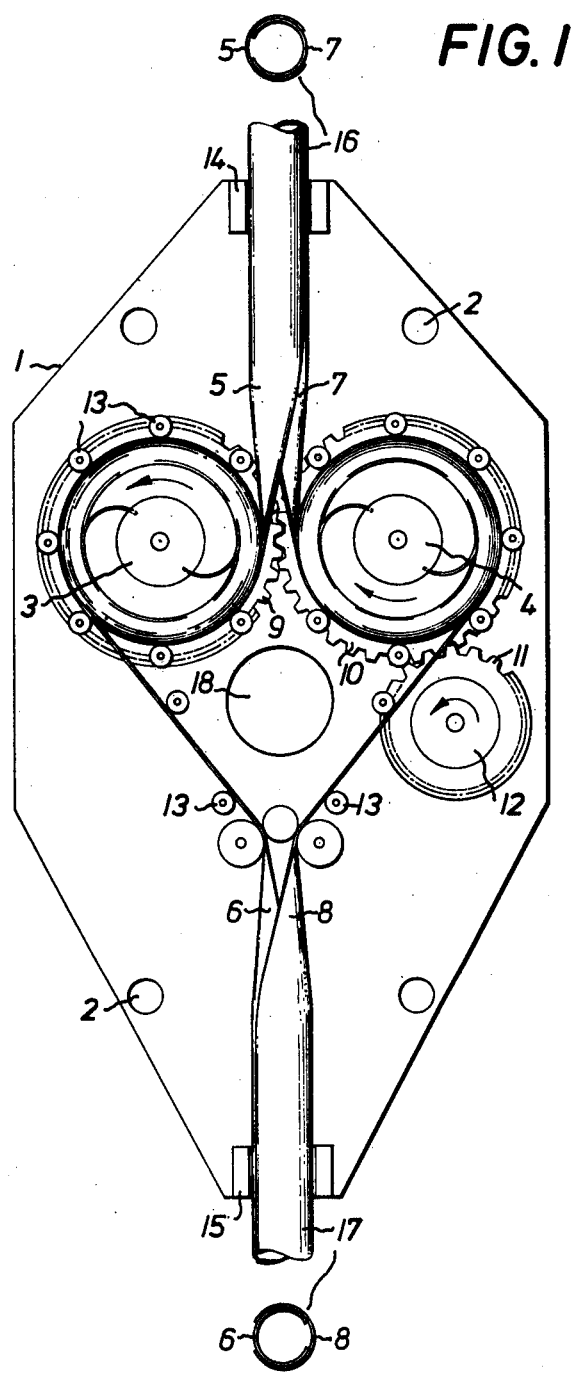
FIG. 1 is a side view of one embodiment of the invention for extending two dual tubes in opposite directions.

In the embodiment shown in FIG. 1, the housing of the unfurling device is formed by two bedplates of which only the lower bedplate 1 is shown. The bedplates are connected together by means of screw bolts and spacers which pass through passage openings 2. Bedplate 1 supports drums, or reels, 3 and 4 each carrying two coiled strips. Drum 3 accommodates metal or plastic strips 5 and 6 and drum 4 accommodates strips 7 and 8. Meshing gears 9 and 10 are permanently connected to respective ones of drums 3 and 4. A gear 11 which meshes with gear 10 is permanently connected to the shaft of a drive motor 12. When the motor shaft rotates in the direction of the arrow, shown therewith, drums 3 and 4 undergo, respectively, counterclockwise or clockwise rotation. Rollers 13 are provided to guide strips 5 to 8 to the openings 14 and 15 forming the guidance exits of the unfurling device.

If the strips are unwound from the drums 3 and 4 as shown, to form dual tubes 16 and 17, the energy supplied by the drive motor 12 can be small since the unfurling force provided by the potential energy of the coiled strips aids this process. While the strips 6 and 8 which form tube 17 leave the exit opening 15 of the housing in one unfurling direction, strips 5 and 7 are released in the opposite direction, passing through the space existing between drums 3 and 4 and through exit opening 14 to form tube 16. A known sensing device (not shown) switches off the drive motor when the furling or unfurling process is completed. The cross sections of band 5-8 when they assume their tubular shapes are shown adjacent the broken-off ends of tubes 16 and 17.

Bedplate 1 is provided with a bore 18 centrally between drums 3 and 4 to accomodate fastening means. This type of fastening can thus be in the immediate vicinity of the center of gravity of the overall apparatus, with the result that the supporting structure can be designed to have a significantly lower weight.

There are cases of application in which more than two tubes need be unfurled in different directions from a coiling device.

Figure 2:
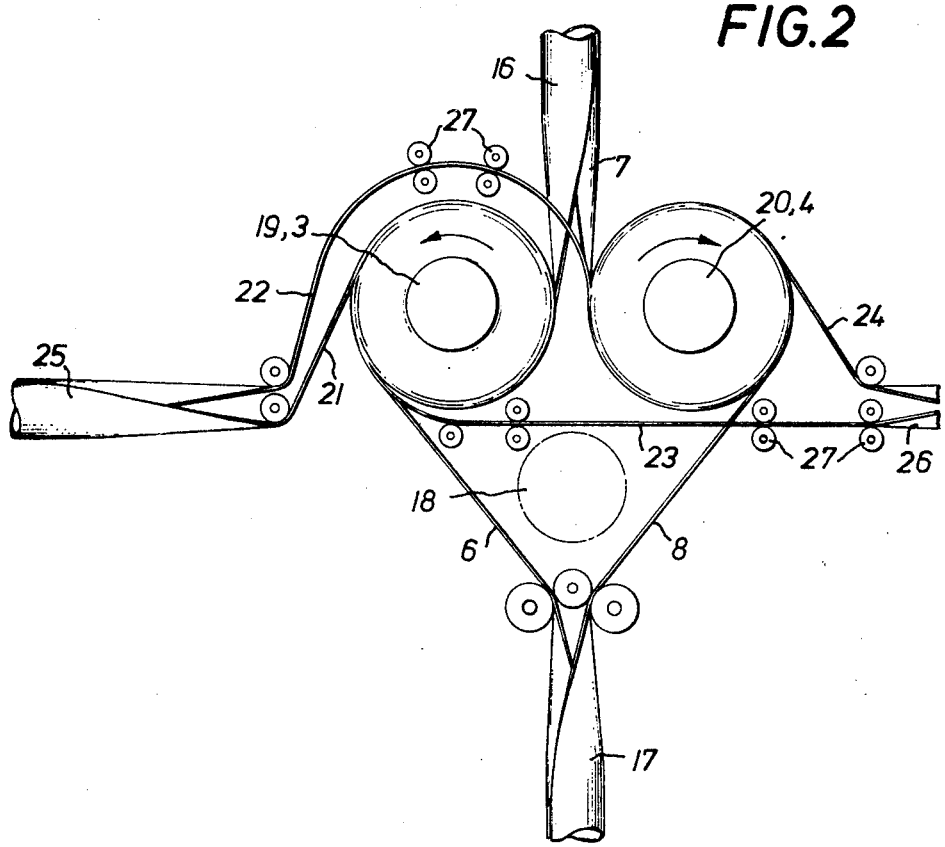
FIG. 2 is a view similar to that of FIG. 1 of a second embodiment for extending four dual tubes, in directions which are 90° apart.
Figure 3:
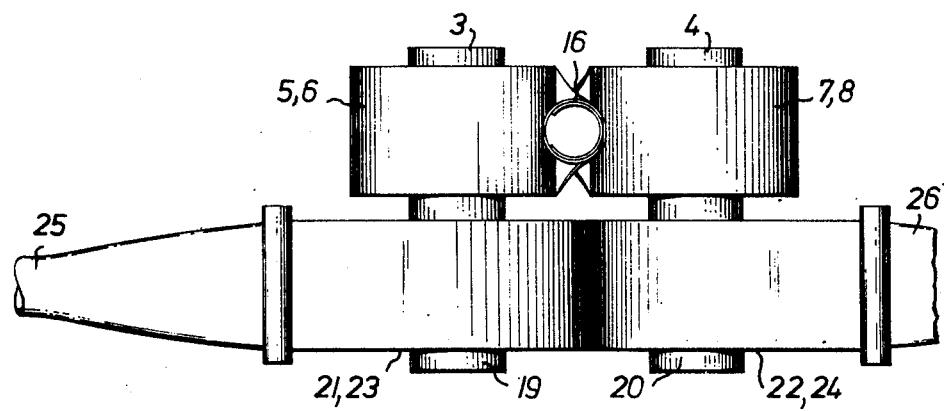
FIG. 3 is a top plan view of the embodiment of FIG. 2.

If, for example, four tubes are required, as shown in FIGS. 2 and 3, further drums 19 and 20 are placed on top of, and in axial alignment with, drums 3 and 4 from which the dual tubes 16 and 17 are unwound. These further drums 19 and 20 are fastened to rotate with drums 3 and 4 so that they can be driven with the aid of the same gears 9 and 10 which also drive drums 3 and 4. Drum 19 carries additional coiled tube-forming strips 21 and 23, while drum 20 carries additional coiled, tube-forming strips 22 and 24. Strips 21 and 22 from drums 19 and 20 respectively, are brought together to form the dual tube 25, while strips 23 and 24 are similarly brought together to form tube 26. Both tubes 25 and 26 are positioned so that their axes lie in a plane which is laterally offset from that of the axes of tubes 16 and 17 and leave the coiling device in directions extending at 90° to tubes 16 and 17. Guide rollers 27 guide the strips 21 to 24 to the predetermined exit openings in the coiling device. At least in part these guide rollers may be common for strips guided in the same direction. They must then merely be made correspondingly longer.

If dual-strip tubes are to be brought out of the device in more than four different directions, further drums may be placed in axial alignment with the drums shown in FIGS. 2 and 3 and the tubes can leave the coiling device in any desired direction. This can result in an umbrella frame-like supporting structure.

It will be understood that the above description of the present invention is susceptible to various modifications, changes and adaptations, and the same are intended to be comprehended within the meaning and range of equivalents of the appended claims.

What is claimed is:

1. A system for establishing tubular structures comprising: two pairs of elongate strips of elastically deformable material, each said strip having been fabricated to normally assume the form of a tube having an axis parallel to the length of said strip and being capable of being coiled about an axis perpendicular to such tube axis and being flattened in the direction of its width while retaining its ability to assume the form of a tube upon being uncoiled; two coiling drums each arranged to receive a respective pair of said strips and each rotatable in a coiling direction of rotation for simultaneously coiling the strips of its respective pair about an axis perpendicular to the lengths of said strips, and in an uncoiling direction of rotation for simultaneously uncoiling the strips of its respective pair; said drums being laterally spaced from one another and being aligned so that the longitudinal center lines of said strips on said drums lie in a common plane; and means defining two guidance exit openings each receiving a respective strip of each said pair in a manner such that during rotation of said drums in their respective uncoiling directions, portions of the two said strips received by each said opening assume the form of a tube and become interengaged to form a dual tubular member.

2. An arrangement as defined in claim 1 wherein said exit openings are located for causing their associated tubular member to project in mutually opposite directions.

3. An arrangement as defined in claim 1 wherein said drums are connected to be driven in mutually opposite directions of rotation.

4. An arrangement as defined in claim 1 wherein said strips forming one said tubular member are guided from their respective drums to their associated exit opening via the space between said drums.

5. An arrangement as defined in claim 4 further comprising: means located in the vicinity of the center of gravity of said system for supporting said system.

6. An arrangement as defined in claim 1 further comprising: two additional pairs of said elongate strips of elastically deformable material; two additional coiling drums each arranged to receive a respective additional pair of said strips and each rotatable in a coiling direction of rotation for simultaneously coiling the strips of its respective pair about an axis perpendicular to the lengths of said strips, and in an uncoiling direction of rotation for simultaneously uncoiling the strips of its respective pair, and each said additional drum being axially offset from a respective one of said first-recited drums; and two receiving means each receiving a respective strip of each said additional pair in a manner such that during rotation of said additional coiling drums in their uncoiling direction, the portions of the respective strips received by each said receiving means assume the form of a tube and become interengaged to form a dual tubular member.

* * * * *